United States Patent
Nadler et al.

(10) Patent No.: US 12,335,094 B2
(45) Date of Patent: Jun. 17, 2025

(54) GENERATING DATA PLANES FOR PROCESSING OF DATA WORKLOADS

(71) Applicant: International Business Machines Corporation, Armonk, NY (US)

(72) Inventors: Sima Nadler, Kochav Ya'ir (IL); Ronen Itshak Kat, Kochav Ya'ir (IL); Michael Factor, Haifa (IL); Shlomit Koyfman, Kiryat Yam (IL); Roee Shlomo, Petah Tikva (IL)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 18/048,530

(22) Filed: Oct. 21, 2022

(65) Prior Publication Data

US 2024/0135016 A1 Apr. 25, 2024
US 2024/0235936 A9 Jul. 11, 2024

(51) Int. Cl.
*H04L 41/084* (2022.01)
*G06F 21/62* (2013.01)

(52) U.S. Cl.
CPC ........ *H04L 41/084* (2013.01); *G06F 21/6218* (2013.01)

(58) Field of Classification Search
CPC .................................................. G06F 21/6218
USPC .......................................... 726/26; 709/223
See application file for complete search history.

(56) References Cited

U.S. PATENT DOCUMENTS

| 11,683,242 | B2* | 6/2023 | Sarangam | H04L 47/822 |
| | | | | 709/226 |
| 2017/0264711 | A1 | 9/2017 | Subramaniam et al. | |
| 2019/0121889 | A1 | 4/2019 | Gold et al. | |
| 2019/0370263 | A1* | 12/2019 | Nucci | G06F 16/254 |
| 2019/0372890 | A1* | 12/2019 | Michael | H04L 43/0864 |
| 2020/0044976 | A1* | 2/2020 | Chang | H04L 45/74 |
| 2020/0112505 | A1 | 4/2020 | Kamath et al. | |
| 2022/0078033 | A1* | 3/2022 | Bysani Venkata Naga | |
| | | | | G06F 9/54 |
| 2023/0016946 | A1* | 1/2023 | Wouhaybi | G06F 16/907 |

OTHER PUBLICATIONS

Emani, V., Optimizing Data Access in Database Applications using Static Analysis, Retrieved from: https://www.microsoft.com/en-us/research/wp-content/uploads/2021/02/Unsigned_Long_Thesis_VenkateshEmani.pdf, 2019, 159 pages.
Hevner, et al., Optimization of Data Access in Distributed Systems, Department of Computer Science Technical Reports, Jul. 1978, 48 pages.
Hwang, Y., Multi-cluster Kubernetes Management Solutions, Retrieved from: https://medium.com/swlh/multi-cluster-kubernetes-management-solutions-e65628cd6aJan0 18, 2021, 9 pages.

(Continued)

*Primary Examiner* — Liang Che A Wang
(74) *Attorney, Agent, or Firm* — Stephen R. Yoder

(57) ABSTRACT

An example system includes a processor to generate a data plane based on dataset metadata, data plane component metadata, data governance decisions, and information technology (IT) system metrics. The processor is to also apply components of the data plane for a specified workload across a number of computing devices selected by a control plane.

19 Claims, 6 Drawing Sheets

(56) References Cited

OTHER PUBLICATIONS

Trouillaud, A., Running Argo Workflows Across Multiple Kubernetes Clusters, Retrieved from: https://admiralty.io/blog/2019/01/17/running-argo-workflows-across-multiple-kubernetes-clusters/, Jan. 17, 2019, 11 pages.
What is ODP? Retrieved from : https://opendataplane.org/index.php/resources/faq/ Retrieved date: Apr. 9, 2025, 14 pages.

* cited by examiner

300

GENERATING DATA PLANES FOR PROCESSING OF DATA WORKLOADS

BACKGROUND

The present techniques relate to data workloads. More specifically, the techniques relate to automated enforcement of data security and governance on data used by workloads.

SUMMARY

According to an embodiment described herein, a system can include processor to generate a data plane based on workload metadata, dataset metadata, data plane component metadata, data governance decisions, and information technology (IT) system metrics. The processor can also further apply components of the data plane for a specified workload across a plurality of computing devices selected by a control plane.

According to another embodiment described herein, a method can include generating, via a processor, a data plane based on workload metadata, dataset metadata, data plane component metadata, data governance decisions, and information technology (IT) system metrics. The method can further include applying, via the processor, components of the data plane for a specified workload across a plurality of computing devices selected by a control plane.

According to another embodiment described herein, a computer program product for generating data planes can include computer-readable storage medium having program code embodied therewith. The program code executable by a processor to cause the processor to generate a data plane based on workload metadata, dataset metadata, data plane component metadata, data governance decisions, and information technology (IT) system metrics. The program code can also cause the processor to apply components of the data plane for a specified workload across a plurality of computing devices selected by a control plane.

DETAILED DESCRIPTION

Figure 1A:
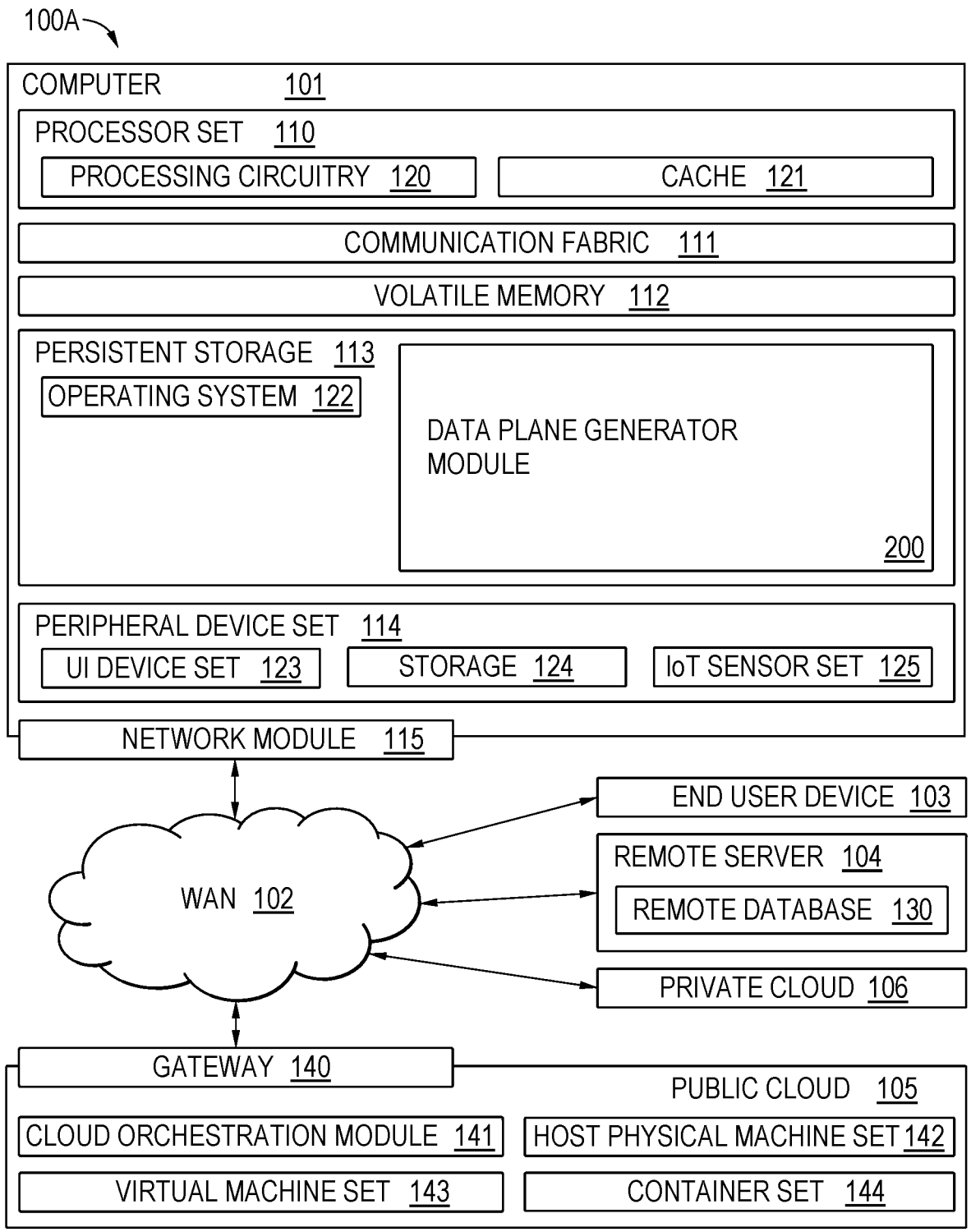
FIG. 1A is a block diagram of an example computing environment that contains an example of an environment for the execution of at least some of the computer code involved in performing the inventive methods, such as data plane generation.

Multi-cloud environments may be used to share data between organizations and users. However, enabling use of data in a secure and governed manner in a multi-cloud environment may be difficult. For example, laws, industry standards, and organization policies dictate how, by whom, where and for what data may be used based on the specific context. Context, such as the content of the dataset and the purpose for which the dataset will be used, may affect whether the data may be used. Moreover, such policies may also dictate that the data from the dataset should be transformed before use.

Manual processes may be used by organizations to address some of these problems. For example, a user may request data. The request may be reviewed by a data governance officer who denies or approves and/or provides ad hoc guidance on transformations required to be performed on the data. An information technology (IT) administrator may then copy, transform, and provide an endpoint and credentials to the user, who uses the data. Infrastructure and tools for these tasks may be chosen based on infrastructure availability, cost/company guidelines. Upon completion of use, the user or IT administrator may be responsible for deleting the temporary copy. Various tools may be used to do parts of these tasks, but there is no end-to-end mechanism that orchestrates this whole process. For example, Extract, Transform, and Load (ETL) tools may enable jobs to be written to copy and transform data, but those jobs are written manually for each dataset requested, and such tools do not handle clean-up of the data after it is no longer needed. Moreover, the entire process may take months to complete.

According to embodiments of the present disclosure, a system includes a processor to generate a data plane based on workload metadata, dataset metadata, data governance decisions, and information technology (IT) system metrics. The processor can apply components of the data plane for a specified workload across a number of computing devices selected by a control plane. As one example, the system may take into account the following: context about the workload that may be provided by a data user, data governance policy decisions obtained from an external policy manager via which a governance officer defined the rules dictating the proper uses of data, metadata relating to the datasets required by the user obtained from an external data catalog, information about the available infrastructure, its costs and capabilities provided via our system by an IT administrator, and a description of the capabilities available as defined by developers to include in the data path. For example, the description of capabilities may include protocols for reading, writing, transforming data, etc. In various examples, the system takes all of this information and defines a data path to provide the data to the user in a governed and efficient manner. This may require copies of the data to be made and cleaned up when no longer needed, masking of the transformations on the data, etc. When the user or his workload writes data, the system can automatically determine a best place for the data to be stored based on governance requirements, among any other suitable factors. Thus, embodiments of the present disclosure enable the use of data without the data user having to address non-functional requirements such as data governance regulations. The embodiments handle these things behind the scenes as a user's application reads, writes, deletes, or copies data.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as data plane generator module 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated. In various examples, the computer 101 may be a coordinating node device of a container orchestration system, which may be deployed across the public cloud, private cloud, or both. For example, the container orchestration system may be the Kubernetes open-source container orchestration system, first released in June 2014, and the computer 101 may be a Kubernetes master main controlling unit.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 1B:
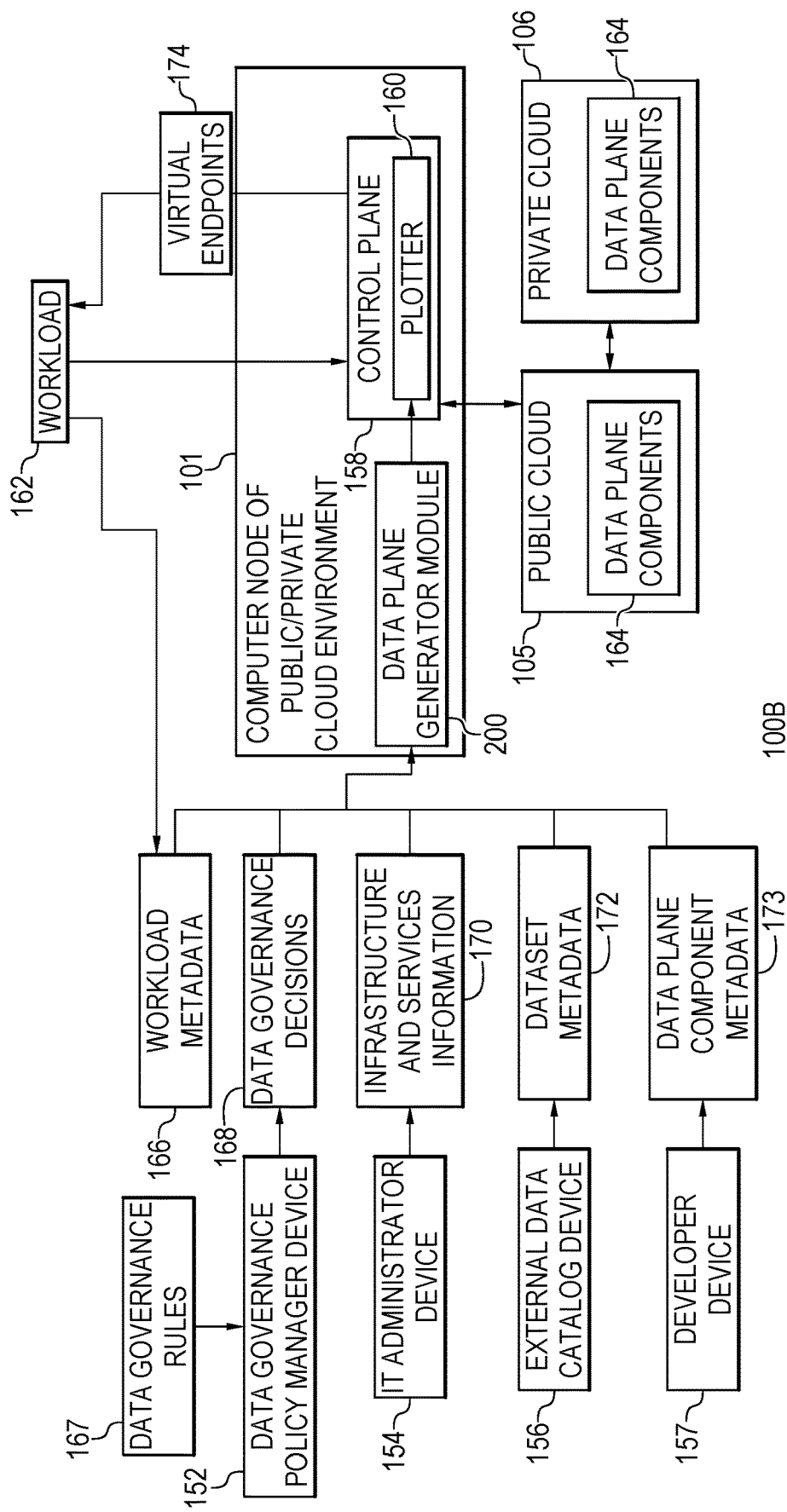
FIG. 1B is a block diagram of an example system that can automatically generate data planes for workloads interacting with data.

FIG. 1B is a block diagram of an example system that can automatically generate data planes for workloads interacting with data. The example system 100B includes similarly referenced elements from the operating environment 100A of FIG. 1A. In addition, the system 100B includes a data governance policy manager device 152, an information technology (IT) administrator device 154, an external data catalog device 156, and a developer device 157, communicatively coupled to the computer 101. In various examples, the computer 101 may be part of either a public cloud 105 or private cloud 106. For example, the computer 101 may be a Kubernetes master node as described in FIG. 1A. The computer 101 includes a control plane 158. The control plane 158 generates a plotter 160 that defines the generated data plane from the data plane generator module 200. The system 100B also further includes a workload 162. For example, the workload 162 may be received in the form of a Yet Another Markup Language (YAML) file that indicates the data sets requested and context regarding the workload. In some examples, the YAML file may be generated manually by the workload user or developer. In some examples, the YAML file may be generated as part of an integration between a development environment and the system 100B. The workload 162 itself may run in a cluster of a private cloud 106 or a public cloud 105. The public cloud 105 and private cloud 106 both include data plane components 164. For example, each of the data plane components 164 may be one or more deployed components of the data plane 160. The system 100B also includes workload metadata 166 shown received from the workload 162. For example, the workload metadata 166 may include information about the workload, the owning organization, a role of the person using the workload, among other relevant information. In some examples, the workload metadata 166 may also include datasets to be processed and the actions to be taken on the datasets. For example, the actions may include to read, write, copy, or delete data. In some examples, the workload metadata 166 may also include workload cluster geography and cluster on which the workload is running. The system 100B also includes data governance rules 167 shown being received at the data governance policy manager device 152. For example, the data governance rules may be received from a device (not shown). In various examples, the data governance rules may include rules governing the use of personal information. As one example, the data governance rules may include that the personal information of Australian citizens may not leave Australia without being masked, or that the personal information of European Union (EU) residents may not be used for marketing without explicit consent of the data subject.

The data governance policy manager device 152 is shown providing data governance decisions 168. For example, the data governance decisions 168 may be the result of a data governance engine processing all of the data governance rules for a specific query. The IT administrator device 154 is shown providing infrastructure and services information 170. For example, the infrastructure and services information 170 may include information such as available clusters and their geography, and available storage accounts and their geography, etc. In some examples, the infrastructure and services information 170 may be provided in the form of modules, as described in FIG. 4. The external data catalog device 156 is shown providing dataset metadata 172. For example, the dataset metadata 172 may include the format, connection info, metadata, and link to credentials for the dataset. In some examples, the dataset metadata 172 may include personal information, classification, and organization terms, among other information. The developer device 157 is shown providing data plane component metadata 173. For example, the data plane component metadata 173 may include information that describes the capabilities of the service, the parameters that the service receives, and the protocols and formats that a service supports. In some examples, the data plane component metadata 173 also provides the information about how to deploy the service.

In various examples, the data plane generator 200 can receive workload metadata 166, data governance decisions 168, infrastructure and services information 170, dataset metadata 172, and data plane component metadata 173, and generates a data plane. For example, the data plane may include a read service deployed in a public cloud cluster in country A, a transform service deployed in country C, and a copy service deployed in private cloud cluster in country B. The control plane 158 may use the generated data plane to generate a plotter 160. For example, the plotter 160 may contain a graph indicating the flow of data from one data plane component 164 to the next data plane component 164 across public cloud 105 and private cloud 106, as well as how to deploy and configure the capabilities in the graph. The control plane 158 may then generate virtual endpoints 174 for a workload 162 to use to access a dataset via the data plane components 164.

Figure 4:
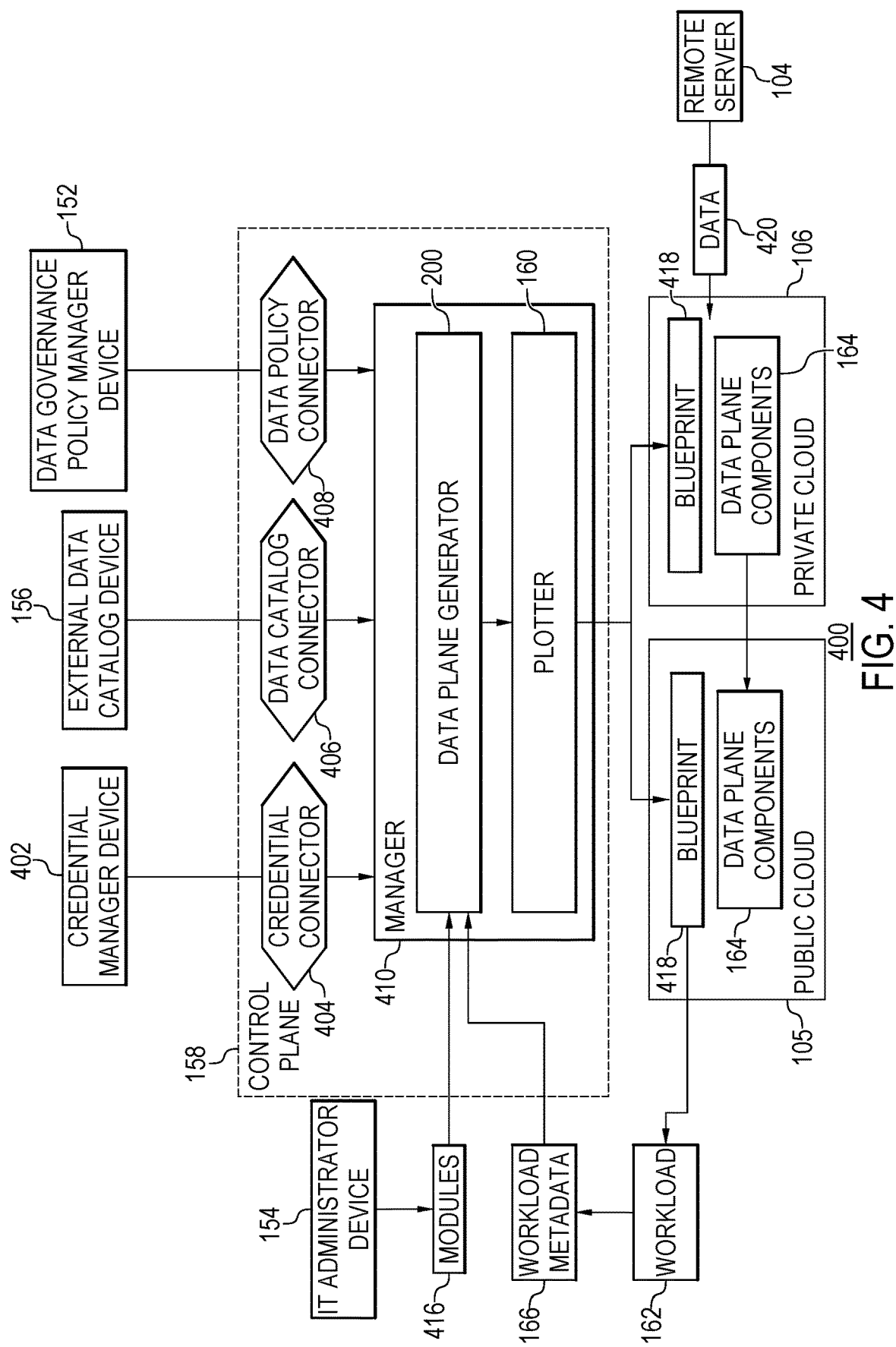
FIG. 4 is a block diagram of another example system for automatically generating data planes for use by workloads interacting with data.

It is to be understood that the block diagram of FIG. 1B is not intended to indicate that the system 100B is to include all of the components shown in FIG. 4. Rather, the system 400 can include fewer or additional components not illustrated in FIG. 4 (e.g., additional workloads, or additional devices, clouds, etc.).

Figure 2:
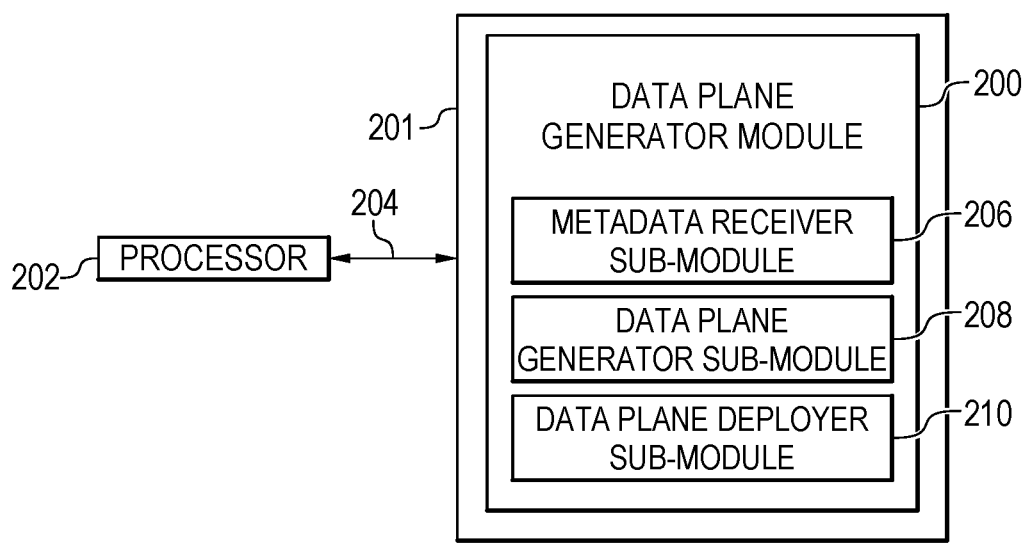
FIG. 2 is an example tangible, non-transitory computer-readable medium that can automatically generate data planes for workloads interacting with data.

Referring now to FIG. 2, a block diagram is depicted of an example tangible, non-transitory computer-readable medium 200 that can automatically generate data planes for workloads interacting with data. The tangible, non-transitory, computer-readable medium 200 may be accessed by a processor 202 over a computer interconnect 204. Furthermore, the tangible, non-transitory, computer-readable medium 200 may include code to direct the processor 202 to perform the operations of the method 300 of FIG. 3.

The various software components of the data plane generator module 200 discussed herein may be stored on the tangible, non-transitory, computer-readable medium 201, as indicated in FIG. 2. For example, the data plane generator module 200 may include a metadata receiver sub-module 206 that includes code to receive workload metadata, dataset metadata, data plane component metadata, data governance decisions, and information technology (IT) system metrics. The data plane generator module 200 also includes a data plane generator sub-module 208 includes code to generate a data plane based on the workload metadata, the dataset metadata, the data plane component metadata, the data governance decisions, and the IT system metrics. The data plane generator sub-module 208 further includes code to receive declared capabilities that can be included in a data path. For example, the data plane generator sub-module 208 includes code to generate the data plane with information including a type of service, capabilities of the service, transforms performed by the service, deployment instructions, and parameters received by the service. The data plane generator sub-module 208 also receives as input metadata about the workload. For example, the data plane generator sub-module 208 also receives information about the specified workload, an owning organization of the workload, and a role of a person using the specified workload. The data plane generator sub-module 208 also includes code to receive a dataset to be processed and the intent for which the data is being processed. In some examples, the data plane generator sub-module 208 also includes code to collect information on a data set and determine relevant governance restrictions regarding action taken on the data set. For example, the data plane generator sub-module 208 also includes code to determine relevant governance restrictions based on metadata explicitly declared by a workload owner, metadata about the dataset and governance decisions received via connectors to an external data catalog and a data governance system, and automatically discovered data including a geographical and physical location of the specified workload and the datasets. In some examples, the data plane generator 200 includes a data plane deployer sub-module 210 that includes code to apply components of the data plane for a specified workload across a plurality of computing devices selected by a control plane. In various examples, the data plane deployer sub-module 210 that includes code to provide a virtual endpoint to the specified workload via which the specified workload accesses the dataset.

Figure 3:
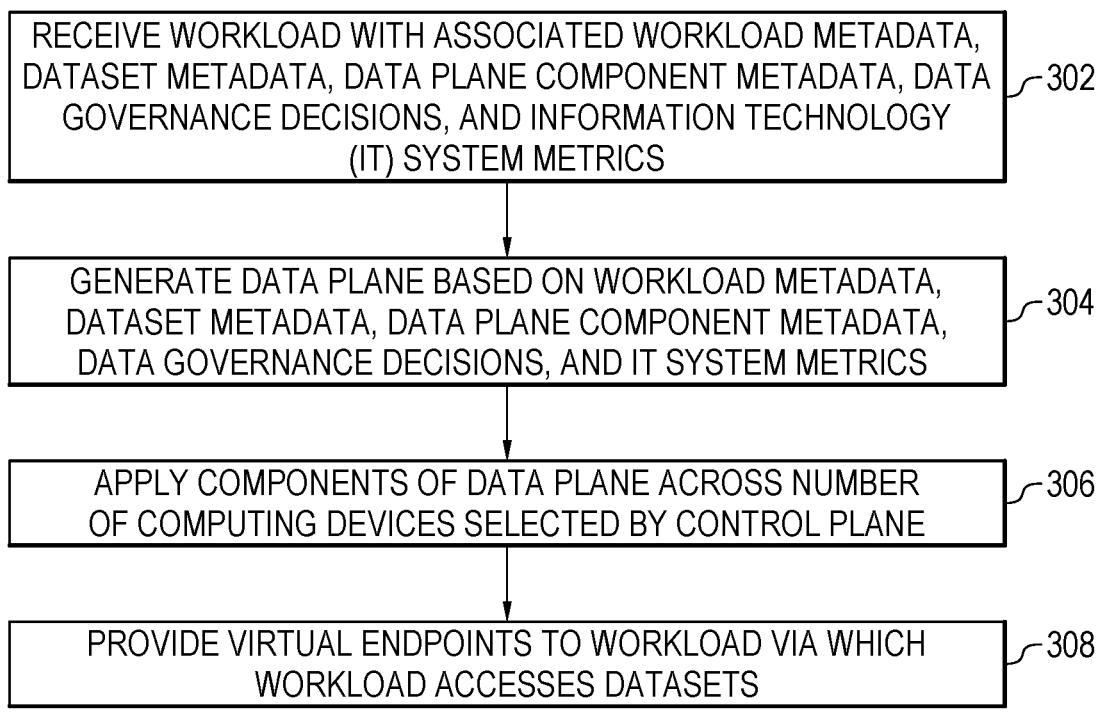
FIG. 3 is a process flow diagram of an example method that can generate data planes for workloads.

FIG. 3 is a process flow diagram of an example method that can generate data planes for workloads interacting with data. The method 300 can be implemented with any suitable computing device, such as the computer 101 of FIG. 1A or FIG. 1B. For example, the methods described below can be implemented by the processor set 110 of FIG. 1A.

At block 302, a processor receives a workload with associated workload metadata, dataset metadata, data plane component metadata, data governance decisions, and information technology (IT) system metrics. In some examples, the processor can collect information on a data set and determine relevant governance restrictions regarding action taken on the data set. For example, the processor can determine relevant governance restrictions based on metadata explicitly declared by a workload owner, metadata about the dataset and governance decisions received via connectors to an external data catalog and a data governance system, and automatically discovered data including a geographical and physical location of the specified workload and the datasets. The data plane component metadata may include information about the available services to be included in components of the data plane.

At block 304, the processor generates a data plane based on the workload metadata, the dataset metadata, the data plane component metadata, the data governance decisions, and the IT system metrics. In some examples, the processor can declare capabilities that can be included in a data path. For example, the processor can generate the control plane with information including a type of a service, capabilities of the service, transforms performed by the service, deployment instructions, and parameters received by the service. In various examples, the processor can determine capabilities to be included in the data plane based on the collected information and relevant governance restrictions. In various examples, the processor can determine capabilities to be included in the data plane and send them to a plotter, wherein the plotter is to generate a blueprint for each environment and cluster in which components of the data plane are to be deployed. In some examples, the processor can receive an infrastructure configuration policy with respect to capabilities, costs, and compliance metrics, and generate the data plane based on the infrastructure configuration policy, the data governance decisions, the workload context, and the data context.

At block 306, the processor applies components of the data plane for a specified workload across a number of computing devices selected by a control plane. For example, the number of computing devices may belong to particular clusters of public cloud or private cloud instances onto which the data plane is deployed. In some examples, the processor can indicate a requirement of the specified workload. For example, the processor can indicate the requirement by providing information about the specified workload, an owning organization of the specified workload, and a role of a person using the specified workload, and providing one or more datasets to be processed and the intent for which the data is being processed, all of which may affect the governance decision.

At block 308, the processor provides virtual endpoints to a workload via which the workload accesses datasets. In various examples, the processor can generate a path between the workload and the dataset with a smallest number of data plane components to be used to process the specified workload.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may further include processing a data request. For example, processing the data request may include providing a virtual path to a user device that sent the data request. In some examples, the method 300 may include automatically processing a data request without credentials for accessing data from the specified workload. For example, the processor can automatically provide credentials used for accessing data directly to the data plane components accessing the data, without providing the credentials to the workload. In some examples, the method 300 may also include receiving an updated data governance policy decision and enforcing the updated data governance policy by restricting access to data with respect to the specified workload.

With reference now to FIG. 4, a block diagram shows an example system for automatically generating data planes for use by workloads interacting with data. The example system 400 of FIG. 4 includes similarly referenced elements from FIGS. 1A and 1B. In addition, the system 400 includes a credential manager device 402. For example, credential manager device 402 may provide credential management services. The system 400 further includes a credential connector 404 to connect the credential manager device 402 to the control plane 158. The system 400 further includes a data catalog connector 406 to connect the external data catalog device 156 to the control plane 158. For example, the data catalog connector 406 can receive information from a data catalog, such as Egeria, Watson Knowledge Catalog (WKC), or any third party catalog. The system 400 also further includes a data policy connector 408 to connect the data governance policy manager device 152 to the control plane 158. For example, the data governance policy manager may be the open policy agent (OPA) service, WKC, or any other data governance policy management service. In various examples, the credential connector 404, the data catalog connector 406, and the data policy connector 408 may be based on any suitable representational state transfer (REST) standard, such as the Open API services, that the control plane 158 uses to connect to external systems. In some examples, the credential connector 404 may alternatively be based on the Vault API. In various examples, these connector services may be deployed alongside the control plane 158. The control plane 158 of system 400 also includes a manager 410. The manager 410 includes a data plane generator 200 shown generating a plotter 160.

The system 400 also further includes modules 416. For example, the modules 416 may include any suitable extract, transfer, and load (ETL) tool. The modules 416 may describe data plane components and thus make the data plane components 164 available to the control plane 158. The functionality described by the modules 416 may be deployed per workload, or the functionality may be composed of one or more components that run independent of the workload and its associated control plane 158. In the case of being deployed per workload, the control plane 158 handles the deployment of the functional component. In the case of independent components, where the functionality of the module runs independently and handles requests from multiple workloads, a client module (not shown) may be deployed by the control plane 158. This client module can pass parameters to the external components and monitor the status and results of the requests to the external components.

The public cloud 105 and private cloud 106 of system 400 is communicatively coupled to the control plane 158 and include data plane components 164 configured according to a blueprint 418. For example, the blueprint 418 may be a description of the data plane components 164 for a particular cluster of a data plane that is based on various input information as described herein. In various examples, the data plane components 164 may be grouped into blueprints based on the cluster and cloud in which the data plane components 164 will run. The blueprint 418 runs in that cluster and deploys the individual components in that cluster. The blueprint 418 may deploy data plane components 164 to fulfill different data-centric requirements. For example, a component that can mask data can be used to enforce a data masking policy, or a component that copies data may be used to create a local data copy to meet performance requirements, etc. The system 400 also further includes data 420 shown being received from remote server 104.

In the example of FIG. 4, the system 400 can automatically generate a data plane from various received information. The processing of the workload 162 may include declaring capabilities which may be included in a data path. The processing may also include indicating the requirements of the workload. The processing may also include collecting information on a dataset and governance restrictions regarding the action being taken on the dataset. For example, the decisions regarding capabilities required and where the corresponding data plane components should run may be based on metadata of the dataset, data governance policies, and the request context. For example, the request context may include intent of use of data, role of person using the data, geography in which the data will be used, etc. The processing may also include receiving data governance decisions from a governance engine. In addition, the processing may include defining a data plane for a given workload and given dataset based on dataset metadata, a request context, data governance decisions, and available capabilities. The processing may further include deploying and monitoring the defined data plane. The processing may also include deleting the data plane when no longer needed by the workload and any temporary data copies that may have been made. Finally, the processing of the workload 162 may include removing the need for the data user to provide credentials to the data by providing virtual endpoints for the workload to use. Each of these are discussed in greater detail below.

In various examples, the received modules 416 of system 400 can declare capabilities that may be included in a data path. For example, developers providing services relevant to data planes may indicate what their service offers and how to deploy and use the service by defining and applying modules 416 in the control plane 158. Each of the modules 416 may thus include various information, such as types of service, capabilities, transforms, deployment instructions, and parameters. For example, the type of service may include whether the services is deployed per workload, multi-tenant, or plug-in to another module, among similar information. The capabilities may include the ability to read, write, delete, etc. In various examples, the transforms may include actions such as redact, mask, encrypt, etc. The deployment instructions may include technical details about how to deploy the service. For example, the technical details may include the particular helm chart to use for deployment. In some examples, the technical details may include the columns of a dataset that should be transformed, the specific type of transform to use. As one example, the transforms may be to mask or redact. The parameters may include any parameters received by the service. For example, the parameters may include specific parameters such as "Columns A, D, G—mask".

In various examples, a workload owner may indicate workload metadata 166 of the workload 162. For example, the workload owner may provide information about the workload, the owning organization, a role of the person using the workload, among other relevant information. In some examples, the workload metadata 166 may indicate the datasets to be processed and the actions to be taken on them. For example, the actions may include to read, write, copy, or delete data. In particular, the data plane generator 200 may obtain instructions regarding any governance related changes that must be performed on the data, identifies the modules 416 capable of performing such changes, and then generates the plotter 160, which defines the secure runtime environment and all the data plane components 164 in the secure runtime environment. As described in greater detail below, this runtime environment provides an application with access to the data requested in a secure manner and without having to provide any credentials for the datasets. The credentials are obtained automatically by the manager from the credential management system.

Still referring to FIG. 4, the control plane 158 of system 400 may collect information on the data set and governance restrictions regarding the action being taken on the dataset. In various examples, the control plane 158 may take into account many different types of inputs to determine which governance restrictions are relevant to the given dataset. For example, the control plane 158 may take into account input explicitly declared by the workload owner. Such explicitly declared input may include metadata describing the workload. For example, the workload may be a production workload, or a development workload. The explicitly declared input may also include workload and information about the data user, such as an associated organization, and the role of the user. In some examples, the control plane 158 may collect information via connector 406 to an external data catalog device 156 and connector 408 to data governance systems, such as a data governance policy manager device 152. In some examples, such information may include metadata about the dataset. For example, external data catalog information may include columns containing personal information, classification, and organization terms, among other information. The data governance information may include governance decisions. In various examples, the control plane 158 may also collect automatically discovered information, such as a geographical and physical location of a cluster running the workload 162. The data plane generator 200 may then take all the above information and determine which capabilities are to be included in a generated data plane.

The control plane 158 can also receive dataset info from a workload user or developer and data governance decisions from a governance engine. For example, a list of datasets may be provided by a workload developer or user in a YAML file and the data plane generator 200 may also have access to metadata about the workload. In various examples, the control plane 158 can note the action to be performed on the dataset. In various examples, the action may be to read, write, copy, or delete, data 420 in the dataset, among other possible actions. The control plane 158 may then get workload cluster geography and cluster on which the workload is running. For each dataset required by the workload, the control plane 158 can call the external data catalog device 156 to get dataset metadata including info about the dataset. For example, the information may include the format, connection info, metadata, and link to credentials for the dataset. In various examples, the credentials may be received from the credential manager device 402 via the credential connector 404. The control plane 158 can then call the data governance policy manager device 152 to get the governance decisions for the action on the specific dataset, taking into account the location of the workload and other context provided by the user. For example, the context may include organization, role, etc. If the result is a denial, then the control plane 158 can update a status for the dataset to a value of "denied". For example, the status may be stored in a status section of the data plane generator 200.

In various examples, the data plane generator 200 of the control plane 158 can define a data plane for a given workload and given dataset. The data plane generator 200 can detect the capabilities required, such as being able to make a temporary copy, to redact personal info, to read data, etc. Once the required capabilities are known, the control plane 158 may then determine whether the capabilities required are available. For example, the control plane 158 may detect that a module 416 deployed in the control plane 158 with the specified capability. The control plane 158 can also determine a module 416 that can perform the capabilities on the data of the specified format, in the specified protocol. The control plane 158 can then determine the cluster to which the module 416 is to be deployed and configured. In some examples, a multi-tenant instance of the service may be preferred, rather than deploying per workload. The control plane 158 can then define a graph indicating the flow of data from one data plane component to the next data plane component. For example, the control plane 158 may thus define the input and output of each of the modules 416. In some examples, the control plane 158 may thus also enable isolation. For example, the control plane 158 may ensure that only the relevant workloads and module services have access to the services running in the data plane. In various examples, the control plane 158 then creates a plotter that contains the graph as well as how to deploy and configure the capabilities in the graph.

In some examples, the control plane 158 may include certain assumptions when defining the data plane. In particular, a number of base capability assumptions may include deploying a read module in response to detecting that the workload is requesting to read data. The base capability assumptions may include deploying a write module in response to detecting that the workload is requesting to write data. In addition, the base capability assumptions may include deploying a delete module in response to detecting that the workload is requesting to delete data. The base capability assumptions may further include deploying a copy module in response to detecting that the workload is requesting to ingest data. In some examples, another assumption may be that the read and write capability module is deployed in the same cluster as the workload. Furthermore, another assumption may be a temporary copy is made near the workload that in response to detecting that the data is in a different cluster than the workload. This temporary copy may also be deleted once the workload completes. Finally, another assumption may be that the multi-tenant implementation is preferred in response to detecting that a given capability has both a multi-tenant and a single-tenant implementation.

In various examples, the data plane generator 200 can generate paths for accessing datasets. For example, the data plane generator 200 can collect environment information, such as the clusters, registered modules, storage account of the dataset. The data plane generator 200 can then find all valid data paths between the data set source and the workload. For example, the data plane generator 200 can first construct data paths using interface connections, starting from data source. In some examples, if governance decisions=deny, then the data plane generator 200 may not generate a data plane for the given dataset. Otherwise, the data plane generator 200 can determine the capabilities that are be included. In various examples, if the data action is read, then the control plane 158 includes read capability. If data action is write, then the data plane generator 200 includes write capability. If action is delete, then the data plane generator 200 includes delete capability. In some examples, if data is in different cluster than the workload, then the data plane generator 200 can allocate storage and add to the path requirement a capability to copy the data to the workload geography and cluster. In various examples, the data plane generator 200 can then loop over all of the modules available and check if there is a module that meets both the capabilities required and the protocol and formats requested by the workload. If so, the data plane generator 200 can add such module to path. If not, then the data plane generator 200 can report no path can be built. In some examples, if governance decisions dictate the need for transformations, then the data plane generator 200 can check if existing components in the path can execute these transforms. If so, then the data plane generator 200 can add components to execute the transform. If none such existing components exist, then path may not be able to be built. Then, the data plane generator 200 can add transformations to the found paths, and assign clusters. In various examples, the data plane generator 200 can then choose the shortest of the valid paths found.

It is to be understood that the block diagram of FIG. 4 is not intended to indicate that the system 400 is to include all of the components shown in FIG. 4. Rather, the system 400 can include fewer or additional components not illustrated in FIG. 4 (e.g., additional workloads, or additional devices, clouds, servers, etc.).

Figure 5:
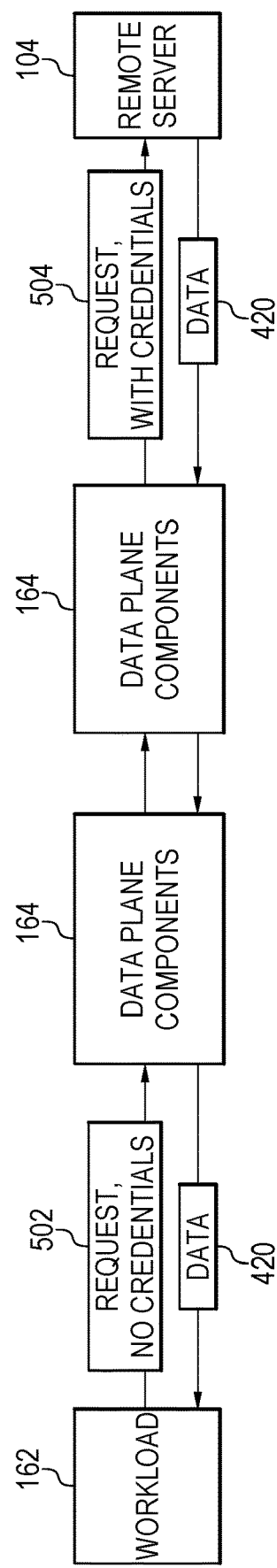
FIG. 5 is a block diagram of an example system that can automatically process data using generated data planes without user credentials.

With reference now to FIG. 5, a block diagram shows an example system that can automatically process data using generated data planes without user credentials. The example system 500 of FIG. 5 includes similarly referenced elements from FIGS. 1 and 4. In addition, the system 500 includes a request 502 received without credentials from workload 162. The system 500 includes a request 504 with credentials showing being sent by the data plane components 164. The remote server 104 is shown receiving request 504 and providing data 420 in response to receiving the request 504.

In the example of FIG. 5, the system 500 can remove the need for the data user to provide credentials to the data set. For example, the data owner who registers the dataset in the data catalog may provide credentials for accessing the data. In some examples, this may be in the data catalog, or in a separate credential management system. Upon completion of deployment of the data plane, the workload or data user receives from the system 400 a virtual endpoint for interacting with the data set. The workload or data user does not receive any credentials. Rather, the system 500 may acts on behalf of the user, providing the path to the credentials that the system 500 receives from the credential management system (not shown) to the services that the system 500 deployed and configured via which the user interacts with the data. Thus, when the user interacts with the dataset via the virtual endpoint provided by the system 500, the credentials are handled automatically. The handling of credentials is transparent to the user, whether the user is operating on the source data set or a temporary copy. Moreover, since the user does not have access to the credentials, security risks are therefore decreased.

It is to be understood that the block diagram of FIG. 5 is not intended to indicate that the system 500 is to include all of the components shown in FIG. 5. Rather, the system 500 can include fewer or additional components not illustrated in FIG. 5 (e.g., additional workloads, or additional requests, data plane components, servers, data actions, etc.).

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a processor set; and
a computer-readable storage medium having program instructions stored therein;
wherein:
the processor set executes the program instructions, causing the processor set to:
receive, from a user, a specified workload including a request for a dataset;
generate a data plane made up of data plane components, the data plane generated according to required capabilities of the specified workload based on workload metadata, dataset metadata, data plane component metadata, data governance decisions, and information technology (IT) system metrics provided in the specified workload, the workload metadata indicating the requested dataset and a workload context;
generate a plotter of the specified workload, the plotter containing a graph indicating a flow of data among the data plane components from a first data plane component to a second data plane component across a public cloud environment and a private cloud environment and indicating how to deploy and configure the required capabilities in the graph; and
apply the data plane components for the specified workload according to the plotter across a plurality of computing devices belonging to clusters of cloud instances for the public or private cloud environments, the data plane being deployed onto the plurality of computing devices.

2. The system of claim 1, further causing the processor set to:
automatically process the request for a dataset without using dataset access credentials from the specified workload, the credentials provided directly to the data plane components accessing the dataset.

3. The system of claim 1, further causing the processor set to:
provide a virtual endpoint to the specified workload for accessing the requested dataset of the specified workload.

4. The system of claim 1, further causing the processor set to:
determine the required capabilities to be included in the data plane and in which cluster of cloud instances the required capabilities are to be deployed, and the plotter for the specified workload includes a blueprint for each environment and cluster in which data plane components are to be deployed.

5. The system of claim 1, further causing the processor set to:
receive an updated data governance policy decision and enforce the updated data governance policy decision by restricting access to or altering the dataset with respect to the specified workload.

6. The system of claim 1, further causing the processor set to:
receive an infrastructure configuration policy with respect to the required capabilities, and generate the data plane based on the infrastructure configuration policy, the data governance decisions, and the workload context.

7. A computer-implemented method comprising:
receiving, from a user device, a specified workload including a request for a dataset;
generating a data plane made up of data plane components, the data plane generated according to required capabilities of the specified workload based on workload metadata, dataset metadata, data plane component metadata, data governance decisions, and information technology (IT) system metrics provided in the specified workload, the workload metadata indicating the requested dataset and a workload context;
generating a plotter of the specified workload, the plotter containing a graph indicating a flow of data among the data plane components from a first data plane component to a second data plane component across a public cloud environment and a private cloud environment and indicating how to deploy and configure the required capabilities; and
applying the data plane components for the specified workload according to the plotter across a plurality of computing devices belonging to clusters of cloud instances for the public or private cloud environments, the data plane being deployed onto the plurality of computing devices.

8. The computer-implemented method of claim 7, further comprising:
providing a virtual endpoint to the specified workload for accessing the requested dataset of the specified workload.

9. The computer-implemented method of claim 7, further comprising:
declaring certain capabilities in a data path by:
generating a control plane having information including: a type of a service, capabilities of the service, transforms performed by the service, deployment instructions, and parameters received by the service.

10. The computer-implemented method of claim 7, further comprising:
indicating a requirement of the specified workload.

11. The computer-implemented method of claim 7, further comprising:
collecting information on the requested dataset; and
determining relevant governance restrictions regarding actions taken on the requested dataset.

12. The computer-implemented method of claim 11, further comprising:
determining the required capabilities to be included in the data plane based on the collected information and the relevant governance restrictions.

13. The computer-implemented method of claim 7, further comprising:
processing the request for the dataset, by providing a virtual path to the user device from which the request was received.

14. The computer-implemented method of claim 7, further comprising:
automatically processing the request for the dataset without using dataset access credentials from the specified workload, the credentials provided directly to the data plane components accessing the dataset.

15. A computer program product for generating data planes, the computer program product comprising a computer-readable storage medium having program code embodied therewith, the program code executable by a processor to cause the processor to:
receive, from a user, a specified workload including a request for a dataset;
generate a data plane made up of data plane components, the data plane generated according to required capabilities of the specified workload based on workload metadata, dataset metadata, data plane component metadata, data governance decisions, and information technology (IT) system metrics provided in the specified workload, the workload metadata indicating the requested dataset and a workload context;
generate a plotter of the specified workload, the plotter containing a graph indicating a flow of data among the data plane components from a first data plane component to a second data plane component across a public cloud environment and a private cloud environment and indicating how to deploy and configure the required capabilities; and
apply the data plane components for the specified workload according to the plotter across a plurality of computing devices belonging to clusters of cloud instances for the public or private cloud environments, the data plane being deployed onto the plurality of computing devices.

16. The computer program product of claim 15, further causing the processor to:
declare certain capabilities in a data path by generating a control plane having information including:
a type of service, capabilities of the service, transforms performed by the service, deployment instructions, and parameters received by the service.

17. The computer program product of claim 15, further causing the processor to:
indicate a requirement of the workload.

18. The computer program product of claim 15, further causing the processor to:
collect information on the requested dataset; and
determine relevant governance restrictions regarding actions taken on the requested dataset.

19. The computer program product of claim 18, further causing the processor to:
determine the required capabilities to be included in the data plane based on the collected information and the relevant governance restrictions.

* * * * *